US011050820B2

(12) United States Patent
Odenheimer et al.

(10) Patent No.: US 11,050,820 B2
(45) Date of Patent: Jun. 29, 2021

(54) CLOUD SHARING SYSTEM

(71) Applicants: Jens Odenheimer, Karlsruhe (DE); Peter Eberlein, Malsch (DE)

(72) Inventors: Jens Odenheimer, Karlsruhe (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 13/873,070

(22) Filed: Apr. 29, 2013

(65) Prior Publication Data
US 2014/0325069 A1    Oct. 30, 2014

(51) Int. Cl.
*H04L 29/08*    (2006.01)
(52) U.S. Cl.
CPC .............. *H04L 67/1012* (2013.01)
(58) Field of Classification Search
USPC ......... 709/201–203, 217–219, 224–226, 232
See application file for complete search history.

(56) References Cited

U.S. PATENT DOCUMENTS

| | | | | |
|---|---|---|---|---|
| 6,260,078 B1* | 7/2001 | Fowlow | ................... | G06F 9/445 717/118 |
| 6,694,434 B1* | 2/2004 | McGee | ................. | G06F 21/565 713/182 |
| 7,225,438 B2* | 5/2007 | Hostetter | ................ | G06F 9/443 712/E9.084 |
| 7,603,464 B2* | 10/2009 | White | .......................... | 709/226 |
| 7,792,967 B2* | 9/2010 | Jones et al. | .................... | 709/226 |
| 7,958,108 B2* | 6/2011 | Nishizawa et al. | ........... | 707/706 |
| 2003/0065774 A1* | 4/2003 | Steiner et al. | ................ | 709/225 |
| 2004/0098447 A1* | 5/2004 | Verbeke | ............... | G06F 9/5055 709/201 |
| 2006/0155694 A1* | 7/2006 | Chowdhury et al. | ............. | 707/4 |

(Continued)

OTHER PUBLICATIONS

Giunta, Francisco, et al. "A GPU accelerated high performance cloud computing infrastructure for grid computing based virtual environmental laboratory." Advances in Grid Computing (2011): 121-146.*

(Continued)

*Primary Examiner* — Suraj M Joshi
*Assistant Examiner* — Melaku Y Habtemariam
(74) *Attorney, Agent, or Firm* — Mintz Levin Cohn Ferris Glovsky and Popeo, P.C.

(57) ABSTRACT

In some example implementations, there is provided a method. The method may include receiving, at a broker interfacing a system, a request to identify whether an executable component is available at one or more cloud service providers; querying a repository at the broker to determine whether the executable component is available at the one or more cloud service providers, the querying of the repository performed based on a hash code identifying the executable component; obtaining, based on a result of the querying, the executable component to the system, when the repository querying indicates that the executable component is available at the one or more cloud service providers; and providing to the system at least one of the obtained executable component or an indication that the executable component is not available at the one or more cloud service providers. Related systems, methods, and articles of manufacture are also provided.

12 Claims, 3 Drawing Sheets

(56) References Cited

U.S. PATENT DOCUMENTS

| | | | | |
|---|---|---|---|---|
| 2010/0125584 A1* | 5/2010 | Navas | ............... | G06F 17/30516 |
| | | | | 707/747 |
| 2010/0293533 A1* | 11/2010 | Andrade | ................... | G06F 8/10 |
| | | | | 717/140 |
| 2010/0313079 A1* | 12/2010 | Beretta | ................. | G06F 9/5055 |
| | | | | 714/48 |
| 2010/0325199 A1* | 12/2010 | Park | ........................ | G06F 16/10 |
| | | | | 709/203 |
| 2011/0016214 A1* | 1/2011 | Jackson | ............... | G06F 9/5044 |
| | | | | 709/226 |
| 2011/0022642 A1* | 1/2011 | deMilo | ............ | G06F 17/30082 |
| | | | | 707/805 |
| 2011/0258615 A1* | 10/2011 | Sollich | ...................... | G06F 8/44 |
| | | | | 717/146 |
| 2012/0143879 A1* | 6/2012 | Stoitsev | ............ | G06F 17/30528 |
| | | | | 707/749 |
| 2012/0180024 A1* | 7/2012 | Gonzalez | ................. | G06F 8/71 |
| | | | | 717/109 |
| 2013/0254762 A1* | 9/2013 | Cochran | ........................... | 718/1 |
| 2013/0317961 A1* | 11/2013 | Malatesta | .............. | G06Q 40/04 |
| | | | | 705/37 |
| 2014/0068583 A1* | 3/2014 | Tejani | ..................... | G06F 8/447 |
| | | | | 717/163 |

OTHER PUBLICATIONS

Limbani, Dhaval, and Bhavesh Oza. "A Proposed Service Broker Strategy in Cloud Analyst for Cost-Effective Data Center Selection." International Journal of Engineering Research and Applications, India 2.1 (2012): 793-797.*

Alex Farkas, and Alan Dearie. Changing Persistent Applications. Springer London, 1995, pp. 303-315.*

* cited by examiner

CLOUD SHARING SYSTEM

TECHNICAL FIELD

This disclosure relates generally to data processing and, in particular, to cloud computing.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications including games.

Some attribute the popularity of computers to the Internet. The Internet provides people with ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Cloud computing is an Internet technology that provides shared resources which are accessible when needed (e.g., on demand) via the Internet. Cloud computing enables a user at a client computer to access computing resources provided by a service, such as a web service coupled to the Internet. The computing resources may include hardware (e.g., computing capability, storage, etc.), software (e.g., operating systems, end-user software applications, etc.), and a combination of both. Cloud computing thus allows a user to go to a single service on the Internet and obtain, on demand, a complete solution stack including the hardware platform and software stack, as well as software applications.

SUMMARY

In some example implementations, there is provided a method. The method may include receiving, at a broker interfacing a system, a request to identify whether an executable component is available at one or more cloud service providers; querying a repository at the broker to determine whether the executable component is available at the one or more cloud service providers, the querying of the repository performed based on a hash code identifying the executable component; obtaining, based on a result of the querying, the executable component to the system, when the repository querying indicates that the executable component is available at the one or more cloud service providers; and providing to the system at least one of the obtained executable component or an indication that the executable component is not available at the one or more cloud service providers.

In some variations, one or more of the features disclosed herein including the following features can optionally be included in any feasible combination. The executable component may represent one of a plurality of executable components forming the system. The repository may store the plurality of executable components and a plurality of hash codes identifying each of the plurality of executable components. The querying may further include determining whether the executable component is available at the one or more cloud service providers based on a match between the hash code identifying the executable component and at least one of the plurality of hash codes. When the executable component is not available at the one or more cloud service providers, a component may be executed. The component, when executed, and another hash code uniquely identifying the component may be provided to the broker to allow access to the component by the querying.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Systems, such as enterprise resource planning (ERP) systems and other like business systems, may include one or more components each of which provides a function within the business system. Moreover, these components may be loaded into the system in the form of a load, such as an executable program entity. Some complex systems may include dozens if not hundreds of components making the compilation and configuration of the system complex and, in some instances, time consuming (which disrupts and detracts from the user's experience with the system).

These components may, as noted, serve as modules forming the overall system, and each of the modules may comprise source code that can be executed by a processor during the installation of the system including the components. Moreover, the source components may in some cases, be compiled on demand as a general, pre-compilation of all of the source components, but this may be very time consuming and may lead to a suboptimal workflow experience for a user having to wait for load generation (e.g., compilation) of the system. Furthermore, this type of on-demand load generation/compilation may be central processing unit (CPU) intensive, causing thus increased response times and delays for other users.

In some example implementations, the subject matter disclosed herein may relate to pre-positioning components in the so-called "cloud," so that a system can access a load as a ready to execute program entity and use this accessed load, rather than compile the load from source components. Moreover, the subject matter disclosed herein may, in some example implementations, include a load broker configured to determine which loads of a system are accessible in a cloud using, for example, an identifier such as a hash code uniquely identifying the loads. Furthermore, the pre-positioning of loads in the cloud may facilitate a generate-once-use-many type of model, e.g., generate the load once and then make the generated load available for use by a plurality of systems.

Figure 1:
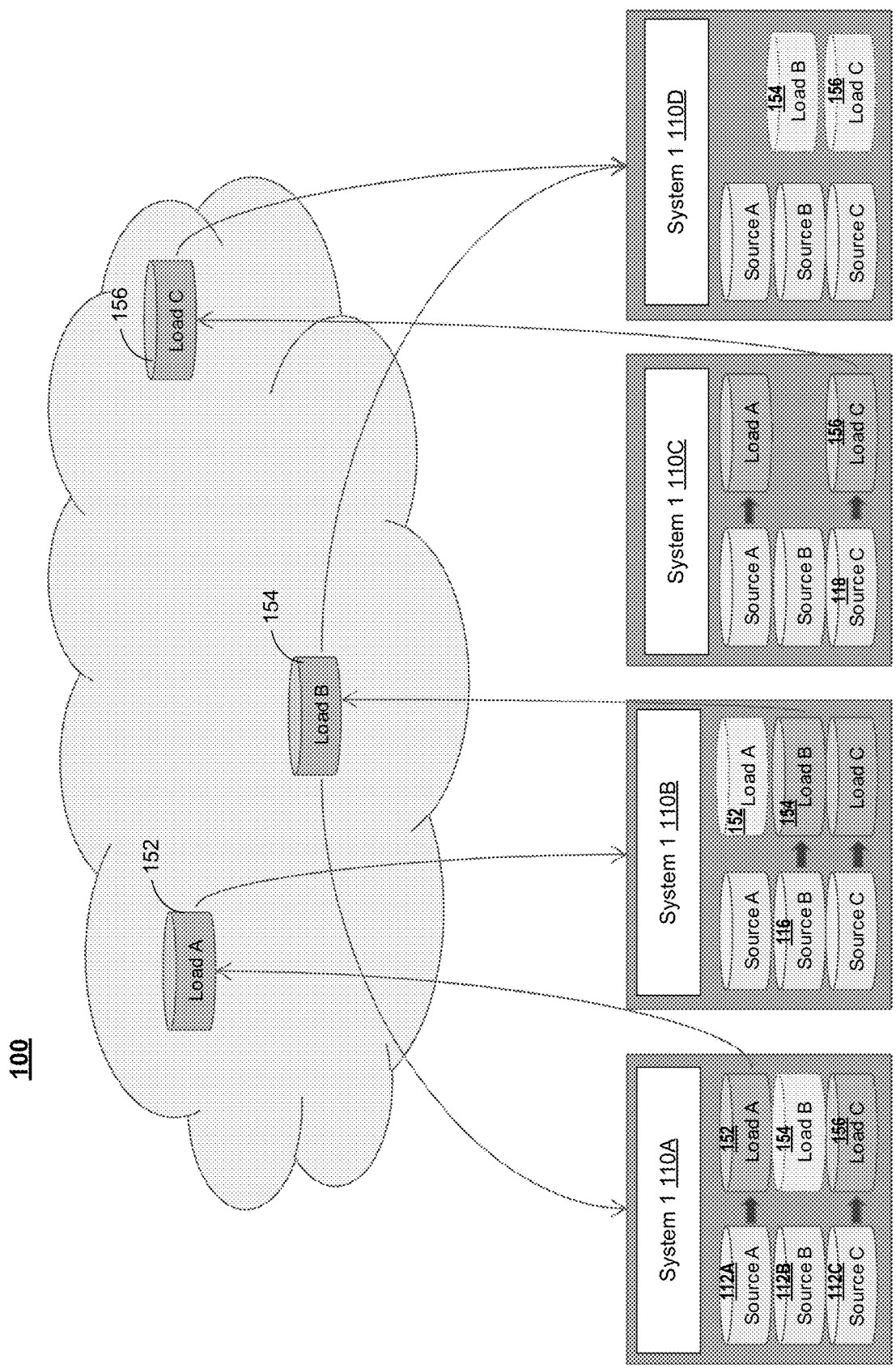
FIG. 1 illustrates an example system including a cloud having prepositioned loads for a plurality of systems, according to some implementations of the current subject matter.

FIG. 1 depicts a system 100 including a cloud 150. The cloud 150 may include one or more loads 152-156 available for download. The loads 152-156 each represent a component that is ready for execution at a processor. An example of this executable entity is binary code. The cloud 150 comprises one or more processors including one or more computer-readable medium, all of which may be coupled by a network, such as the Internet, a private network/intranet, and/or any other type of network.

FIG. 1 also depicts three-business systems 110A-D, each of which includes one or more components. These components may comprise source code that can be compiled into executable program code to provide the components of the system. For example, system 110A includes source code for three components 112A-C. Rather than compile the source code into executable code, system 110A may determine whether one or more of the components 112A-C are available as executable code in cloud 150. If components 112A-C are available as executable code, system 110A may then download the executable code into system 110A and execute that code, rather than compile the original source code of 112A-C.

In the example of FIG. 1, the source code for component B 112B is available in the cloud 150 as executable code, so system 110A can download load B 154 and use the downloaded load B 154 during compilation of system 110A, although system 110A will still have to compile source code A and C 112A and 112C into load A and load C.

In some example implementations, systems may provide components to the cloud for use by other systems. For example, system 110A may compile source code A 112B into executable code, such as load A 152, and then provide that executable code/load A 152 to cloud 150, so that load A 152 can be accessed and downloaded by other systems that require the executable code of load A 152. Indeed, in the example of FIG. 1, system 110B downloads from cloud 150 the executable code for load A 152. System 110B, however, compiles source code B 116 into executable code for load B 154 and then provides that executable code to cloud 150, so that other systems, such as systems 110A and 110D, can use the executable code for load B 154. Similarly, system 110C compiles source code C 118 into executable code for load C 156 and then provides that executable code for load C 156 to cloud 150, so that systems, such as system 110D, can use executable code for load C 156.

Although the previous example describes some of the loads being provided by other systems, loads 152-156 may be provided by any other entity as well, such as a provider and/or a developer of the source code and/or components for systems 110A-110D. Further, although cloud 150 is depicted as a single cloud, the cloud 150 may comprise a plurality of cloud services. For example, a cloud service may be configured as a private cloud accessible only to certain users and/or systems, while another cloud service may be configured as a public cloud accessible a wide variety of users and/or systems.

Figure 2:
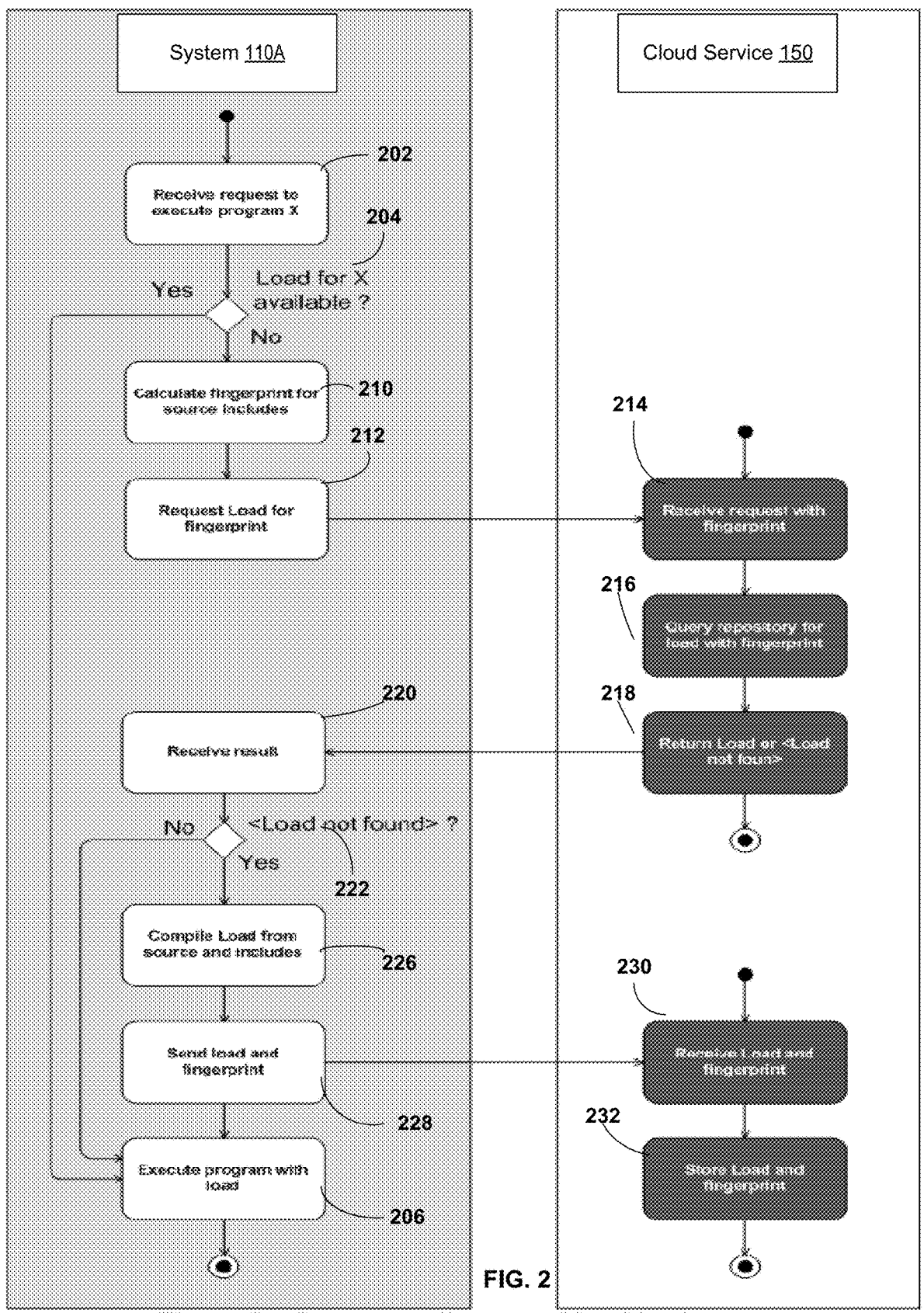
FIG. 2 illustrates a process for accessing and downloading prepositioned loads from a cloud, according to some implementations of the current subject matter.

FIG. 2 depicts an example process for downloading loads to a client, such as system 110A and/or any other processor. The description of process 200 also refers to FIG. 1.

Process 200 depicts a client, which may be implemented as at least one processor and at least one computer-readable storage medium. However, the following description will refer to the client as system 110A, although other types of clients may be used as well. Process 200 also depicts a cloud service, which refers to an interface that can be accessed in cloud 150 to obtain one or more loads for the client 110A.

At 202, a request is received to execute a program. For example, the request may be to execute a program, such as system 110A. This request may be an initial request to execute the system 110A. Consequently, the components 112A-C of system 110A may not be executable, which as noted above may cause compilation delays.

At 204, a load broker may determine what components are required to execute the program, such as system 110A. For example, the load broker may determine what components 112A-C are required for system 110A and determine which of the components are available at system 110A as executable code. If all of the components 112A are available as executable code, system 110A can proceed with execution of the program providing system 110A (yes at 204 and 206). Moreover, the determination at 204 may be determined on-demand, such as one the request is received at 202.

If the load broker determines, however, that one or more components are not available (no at 204) at system 110A, the load broker may attempt to locate the missing components. In some example implementations, the load broker may compute, at 210, an identifier, such as a fingerprint, a hash, and the like. For example, a hash code may be calculated from the source code A 112A, and the hash code serves as a unique identifier for the source code A 112A. This hash code can thus be used to query cloud services, such as service 150, to determine whether the cloud services have executable code for source code A 112A. For example, the load broker may send a request, at 212, to cloud service 150 and the request may include the hash code or other identifier to allow the cloud service 150 to query a repository containing the executable loads.

At 214, the cloud service 150 may receive the request from the client 150. As noted, this request may include one or more identifiers, such as hash codes, identifying the requested loads corresponding to executable code. Referring to FIG. 1, system 110A may send a request to cloud service 150 including a hash code identifying source code B 112B, which is not available at system 110A as an executable load.

At 216, cloud service 150 may query using the identifier such as the hash code, a repository including the loads. Referring to the previous example of FIG. 1, cloud service 150 may query a repository using the hash code identifying source code B 112B. The repository may comprise a storage device including the loads and their corresponding identifiers, such as hash codes and the like.

At 218, the cloud service 150 may respond to the request by providing one or more loads as requested or indicating that the requested load(s) were not found. For example, if the cloud service 150 may query the repository using the hash code identifying source code B 112B and if a matching hash code is found, cloud service 150 may return the executable load 154 to system 110A. However, if a match is not found, cloud service 150 may return an indication that the cloud service 150 does not include the requested load.

At 220, client 150 may then receive the results from 218. For example, when cloud service 150 returns the executable load 154 to system 110A, system 110A may use the returned load. And, then client/system 110A may execute the program (no at 222 and 206). However, if the results indicate that a match was not found, system 110A may either query another cloud service or compile the source code to form the previously requested load (yes at 222 and 226).

In some example implementations, client/system 110A may provide any compiled loads to cloud service at 228. Moreover, the client/system 110A may calculate the corresponding identifier, such as a hash code, for the provided loads to enable identifying the loads from among a plurality of loads. This identifier (also referred to as a fingerprint) may also be provided to the cloud service 150 at 228. When the cloud service receives the load and/or fingerprint at 230, the cloud service 150 may store the load in a repository and index the stored load based on the calculated fingerprint.

Table 1 depicts an example generation of the fingerprint as a hash code. For example, a function can be defined as shown in Table 1 that uses the "source" code for a given component to compute and then return a unique hash code. The hash code may be calculated as a secure hash of the source code, although other types of hash functions may be used as well.

TABLE 1

```
Key* GenerateLoadKey(source)
{
Key *key = secure_hash(source);
for (include in source.includes)
{
Key = key ^ GenerateLoadKey(include);
}
return key;
}
```

Figure 3:
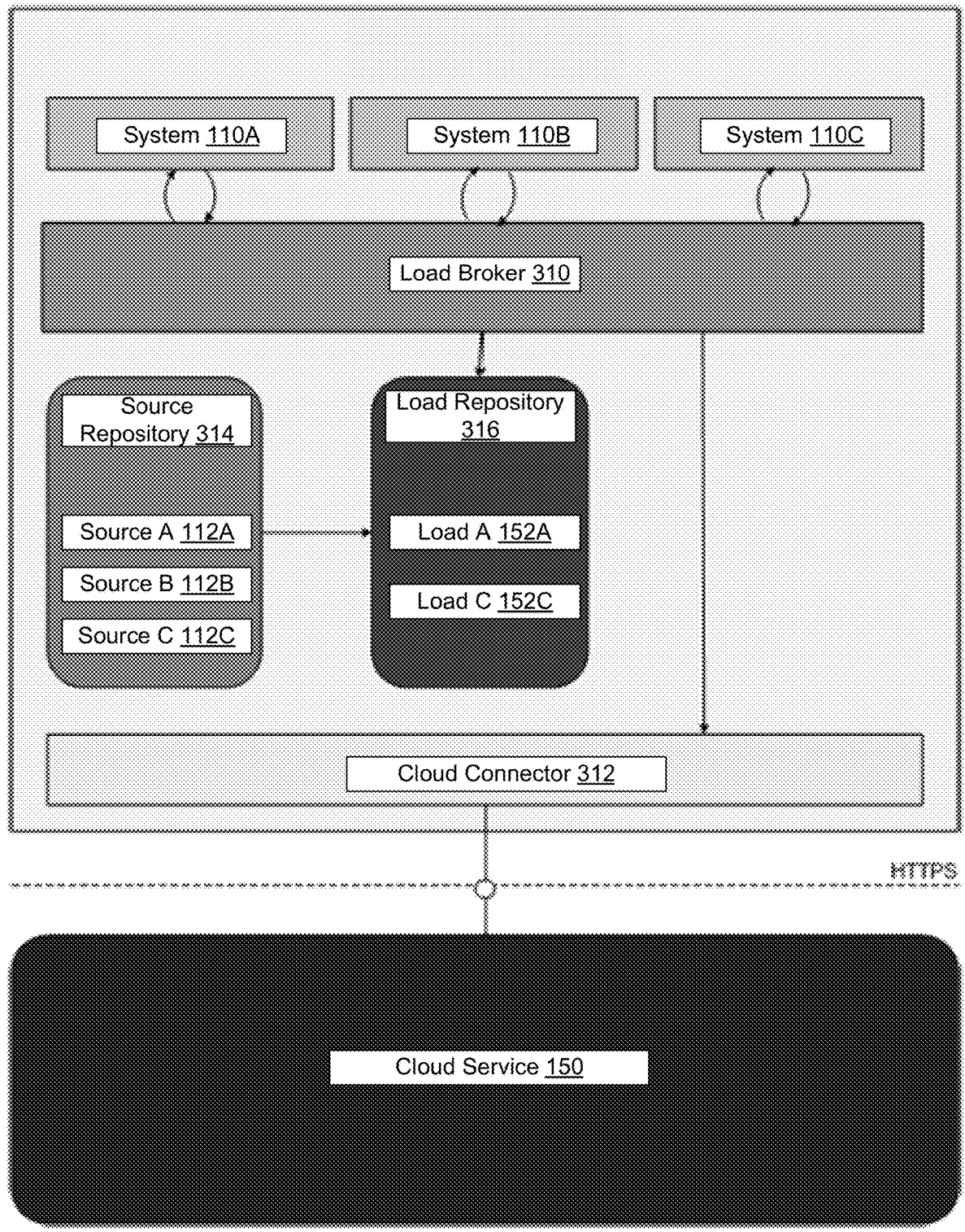
FIG. 3 illustrates another example system including a cloud having prepositioned loads for a plurality of systems, according to some implementations of the current subject matter.

FIG. 3 depicts examples of systems 110A-C, each of which accesses a load broker 310. The load broker 310 is configured to determine component availability and executable load availability for systems 110A-C. For example, when system 110A initiates execution, it may send a request for the load broker 310 to identify whether it needs any executable load. The load broker 310 may then determine which components are used to form system 110A by accessing for example source repository 316 which may include a listing of the components 112A-C used for system 110A and determine which components have been compiled and available at load repository 316. In the example of FIG. 3, load repository 316 includes load A 152 and load C 156, so load broker 310 determines that load A 156 for source code component 112B is needed by system 110A. When this is the case, load broker 310 sends a request for the load B 154 to cloud service 150 via a connector 312. The connector 312 may serve as a security interface/component providing an endpoint for a secure session layer, service request type recognition, and the like. This request may comprise a message sent via a network, such as the Internet, intranet, and/or any other network, to cloud service 150. Moreover, the request may include an identifier, such as a hash code, uniquely identifying the request load B 154.

Cloud service 150 may respond to the request by providing one or more loads as requested or may respond by indicating that the requested load(s) were not found. For example, if cloud service 150 queries a repository using the hash code to find a matching hash code and there is a match, the corresponding load may be provided to load broker 310, which provides the load B 154 as well as loads A 152 and C 156 to system 110A for execution. However, if a match is not found, cloud service 150 may return an indication that the cloud service 150 does not include the requested load for load B 154, in which case load broker 310 may initiate compilation of the source code B 112B into executable load B 154, which can be provided to system 110A (along with an identifier for the load B 154) for execution and/or provided to cloud service 150 for re-use as disclosed herein.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method, comprising:
   providing, to a broker interfacing a system, a request for one or more executable components from one or more cloud service providers, each of the one or more executable components comprising compiled code corresponding to source code available at the system, and each of the one or more executable components identified in the request by a hash of the source code corresponding to the compiled code, the broker including one or more first interfaces to one or more local repositories including one or more candidate executable components and one or more second interfaces, being different from the one or more first interfaces, to the one or more cloud service providers which are queried via a network when the one or more candidate executable components fail to satisfy the request for the one or more executable components, the broker, in response to the request,
   querying, using the one or more first interfaces, the one or more local repositories and querying, using the one or more second interfaces, the one or more cloud service providers to determine whether one or more requested executable components are stored in the one or more local repositories or the one or more cloud service providers, and
   selecting, based on a determination that one or more requested executed components is stored in at least one of the one or more local repositories and the one or more cloud service providers, at least one of a first local repository in the one or more local repositories and a first cloud service provider in the one or more cloud service providers to respond to the request;
   receiving, from the broker and in response to the request, at least a first executable component that is available at the selected first cloud service provider and at least a second executable component that is available at the selected first local repository;
   compiling, by the broker, when at least a portion of the one or more executable components are indicated as unavailable at the selected first local repository and the selected first cloud server, the corresponding source code for each of the unavailable one or more executable components to generate one or more new executable components; and
   executing at least the received first executable component, the received second executable component, and/or the one or more new executable components, wherein the receiving, the compiling, the executing, and the providing are implemented by at least one processor.

2. The method of claim 1, wherein the broker interfaces a plurality of systems configured to generate requests for corresponding executable components.

3. The method of claim 1, wherein the local repository stores a plurality of executable components and a plurality of hash codes, each of the plurality of hash codes identifying each of the plurality of executable components and at least one location for the plurality of executable components.

4. The method of claim 3, further comprising:
    determining whether the one or more executable components are available at the one or more cloud service providers based on a match between the hash identifying the one or more executable components and at least one of the plurality of hash codes.

5. A non-transitory computer-readable storage medium including code, which when executed by the at least one processor provides operations comprising:
    providing, to a broker interfacing a system, a request for one or more executable components from one or more cloud service providers, each of the one or more executable components comprising compiled code corresponding to source code available at the system, and each of the one or more executable components identified in the request by a hash of the source code corresponding to the compiled code, the broker including one or more first interfaces to one or more local repositories including one or more candidate executable components and one or more second interfaces, being different from the one or more first interfaces, to the one or more cloud service providers which are queried via a network when the one or more candidate executable components fail to satisfy the request for the one or more executable components, the broker, in response to the request,
        querying, using the one or more first interfaces, the one or more local repositories and querying, using the one or more second interfaces, the one or more cloud service providers to determine whether one or more requested executable components are stored in the one or more local repositories or the one or more cloud service providers, and
        selecting, based on a determination that one or more requested executed components is stored in at least one of the one or more local repositories and the one or more cloud service providers, at least one of a first local repository in the one or more local repositories and a first cloud service provider in the one or more cloud service providers to respond to the request;
    receiving, from the broker and in response to the request, at least a first executable component that is available at the selected first cloud service provider and at least a second executable component that is available at the selected first local repository;
    compiling, by the broker, when at least a portion of the one or more executable components are indicated as unavailable at the selected first local repository and the selected first cloud server, the corresponding source code for each of the unavailable one or more executable components to generate one or more new executable components; and
    executing at least the received first executable component, the received second executable component, and/or the one or more new executable components, wherein the receiving, the compiling, the executing, and the providing are implemented by at least one processor.

6. The non-transitory computer-readable storage medium of claim 5, wherein the broker interfaces a plurality of systems configured to generate requests for corresponding executable components.

7. The non-transitory computer-readable storage medium of claim 5, wherein the local repository stores a plurality of executable components and a plurality of hash codes, each of the plurality of hash codes identifying each of the plurality of executable components and at least one location for the plurality of executable components.

8. The non-transitory computer-readable storage medium of claim 7, wherein the operations further comprise:
    determining whether the one or more executable components are available at the one or more cloud service providers based on a match between the hash identifying the one or more executable components and at least one of the plurality of hash codes.

9. A system comprising:
    at least one processor; and
    at least one memory including computer program code, which when executed by the at least one processor provides operations comprising:
        providing, to a broker interfacing a system, a request for one or more executable components from one or more cloud service providers, each of the one or more executable components comprising compiled code corresponding to source code available at the system, and each of the one or more executable components identified in the request by a hash of the source code corresponding to the compiled code, the broker including one or more first interfaces to one or more local repositories including one or more candidate executable components and one or more first interfaces, the one or more first interfaces being different from the one or more first interfaces, to the one or more cloud service providers which are queried via a network when the one or more candidate executable components fail to satisfy the request for the one or more executable components, the broker, in response to the request,
            querying, using the one or more first interfaces, the one or more local repositories and querying, using the one or more second interfaces, the one or more cloud service providers to determine whether one or more requested executable components are stored in the one or more local repositories or the one or more cloud service providers, and
            selecting, based on a determination that one or more requested executed components is stored in at least one of the one or more local repositories and the one or more cloud service providers, at least one of a first local repository in the one or more local repositories and a first cloud service provider in the one or more cloud service providers to respond to the request;
        receiving, from the broker and in response to the request, at least a first executable component that is available at the selected first cloud service provider and at least a second executable component that is available at the selected first local repository;
        compiling, by the broker, when at least a portion of the one or more executable components are indicated as unavailable at the selected first local repository and the selected first cloud server, the corresponding source code for each of the unavailable one or more executable components to generate one or more new executable components; and
        executing at least the received first executable component, the received second executable component, and/or the one or more new executable components, wherein the receiving, the compiling, the executing, and the providing are implemented by at least one processor.

10. The system of claim 9 wherein the broker interfaces a plurality of systems configured to generate requests for corresponding executable components.

11. The system of claim 9, wherein the local repository stores a plurality of executable components and a plurality of hash codes, each of the plurality of hash codes identifying each of the plurality of executable components and at least one location for the plurality of executable components.

12. The system of claim 11, wherein the operations further comprise:
- determining whether the one or more executable components are available at the one or more cloud service providers based on a match between the hash identifying the one or more executable components and at least one of the plurality of hash codes.

* * * * *